350-96.1 SR XR 3,447,138 SEARCH ROOM
SUBSTITUTE FOR MISSING XR

OPTICAL ASSOCIATIVE MEMORY

Filed May 18, 1966

INVENTORS
ARTHUR N. CARSON
GABOR K. UJHELYI
BY Fishman & Van Kirk
ATTORNEY

United States Patent Office 3,447,138
Patented May 27, 1969

3,447,138
OPTICAL ASSOCIATIVE MEMORY
Arthur N. Carson and Gabor K. Ujhelyi, Bristol, Conn., assignors to Carson Laboratories, Inc., Bristol, Conn., a corporation of Connecticut
Filed May 18, 1966, Ser. No. 551,155
Int. Cl. G11b 7/02
U.S. Cl. 340—173 21 Claims This invention relates to an optical associative memory. More particularly, this invention relates to an optical associative memory in which optical techniques are used to determine identity, proximity, or inequality between a specified search word and information in a stored memory.

Figure 1:
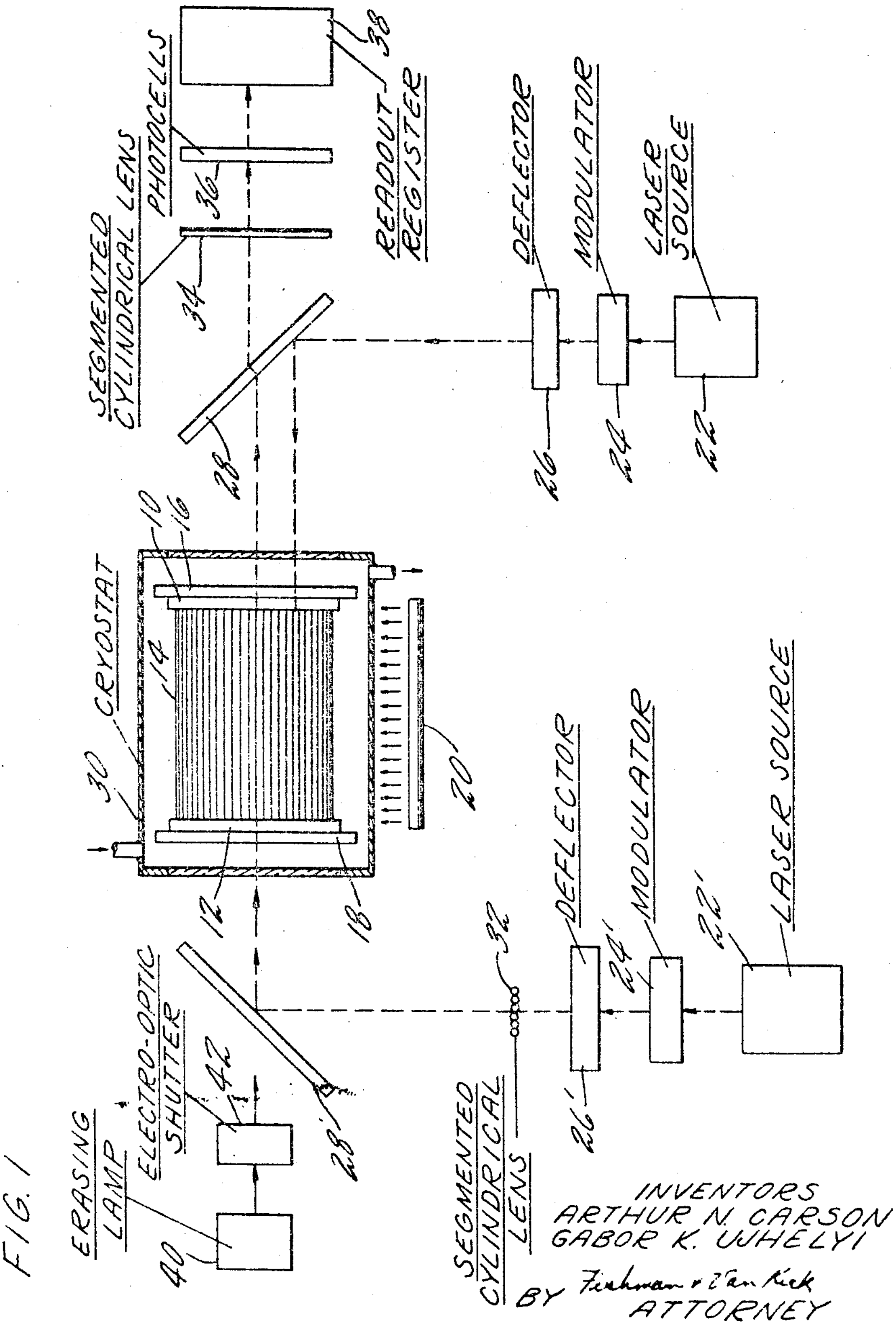

This invention employs color center crystals, such as alkali halide crystals, which have centers therein capable of an alteration of state in response to illumination by light of the proper wavelength. Two color center crystals are used, one for primary memory storage and the other for secondary or search memory storage. The crystals are located within the cavity of an optical fiber bundle laser, with the primary memory at one end of the bundle and the search memory at the other. Highly reflecting mirrors on the outside surfaces of the crystals complete the laser cavity. Color is selectively bleached from the primary storage crystal with an external laser for permanent or relatively permanent information storage in the system. The search crystal is selectively bleached in a manner commensurate with information or a word to be associated with information in the primary storage crystal. Association of bleached areas in the primary storage crystal and the search crystal allows for the oscillation of light within the laser fibers between the cavity-defining mirrors. That is, the location of bleached areas at corresponding points in the primary storage crystal and the search crystal results in the completion of light transmission paths between the cavity defining mirrors through the crystals and fiber lasers to "sensitize" fibers joining corresponding bleached points in the two crystals. Coupling between the fiber lasers, transverse to the axis of the lasers, is designed to be large so that association of information bits within a numerical "word" is obtained when information bit agreement has been provided between coincident bleached patterns in the two crystals. Normally, a single fiber having a complete light-transmission path will possess insufficient gain to attain oscillation due to large transverse coupling losses. Such a fiber will be sensitized. Lasing threshold is adjusted by control of crystal memory absorption and pumping illumination level to permit mutual lasing of a group of adjacent sensitized fibers only when the transverse chain of fibers is of sufficient length to contain a complete word.

Parallel readout can be achieved by observing laser output with a collecting lens arrangement. Variable fields and masks with respect to the primary storage crystal are achieved by artificially forcing a word match, i.e. coincident bleached patterns, in the information bits to be excluded from the field. Proximity between a search word and a word in the primary storage crystal can be determined by small adjustments in lasing threshold, and provision can be made for inequality searching between the search word and information in the primary storage crystal.

Accordingly, one object of this invention is to produce a novel associative memory.

Another object of this invention is to produce a novel associative memory utilizing parallel optical techniques.

Still another object of the present invention is to provide a novel associative memory having identity, proximity, and inequallity search capabilities.

Still another object of the present invention is to produce a novel associative memory using color center crystals having color centers therein capable of a change in state in response to illumination with light of proper wavelength.

Still another object of the present invention is to produce a novel associative memory using colored crystal alkali halide memories for primary information storage and for search storage.

Still another object of the present invention is to produce a novel associative memory using optical fiber lasers and color center crystals, and in which information searching is accomplished through coincident bleaching of the color center crystals and transverse coupling between fiber lasers.

Other objects and advantages will be apparent from the following detailed description and drawings.

In the drawings:

FIGURE 1 is a schematic representation of a plan view of the associative memory of the present invention.

Figure 2A:
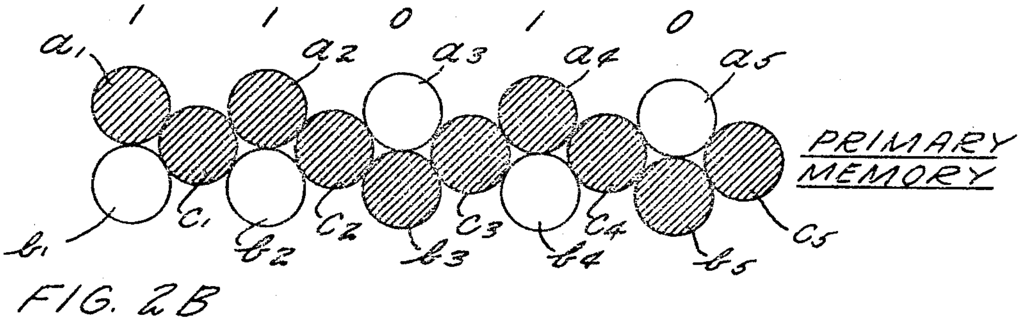

FIGURE 2*a* is an illustrative showing of a section of the primary memory crystal having a certain information pattern stored in that section.

Figure 2B:
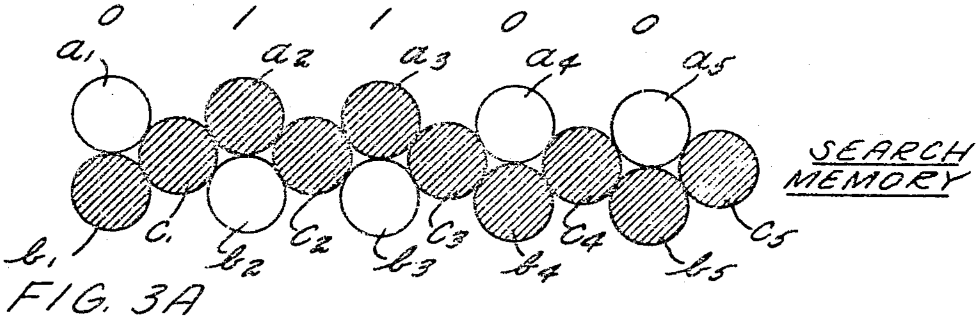

FIGURE 2*b* is an illustrative showing of a word written into the search memory crystal to be compared with the primary memory crystal of FIGURE 2*a*.

Figure 3A:
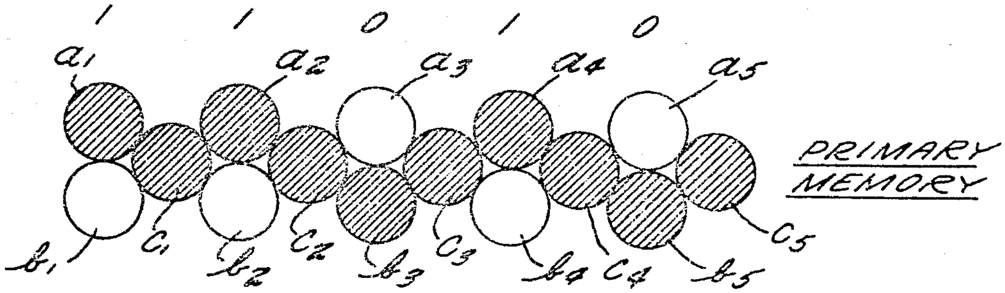

FIGURE 3*a* is a repeat showing of the primary crystal of FIGURE 2*a*.

Figure 3B:
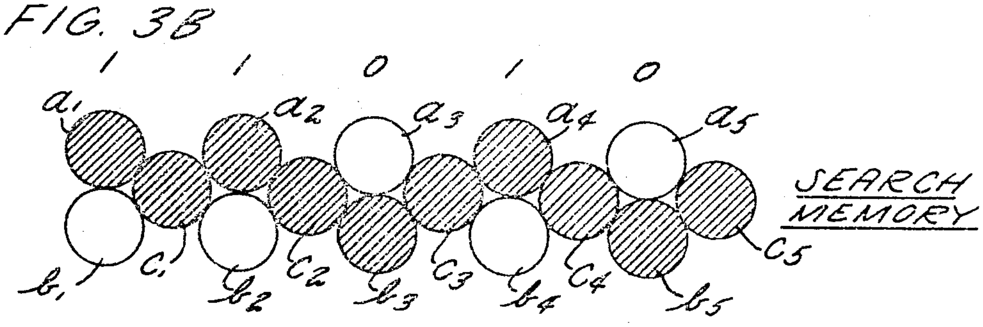

FIGURE 3*b* is a showing of a word written into the search memory crystal to be associated with the primary memory crystal of FIGURE 3*a*.

Figure 4A:
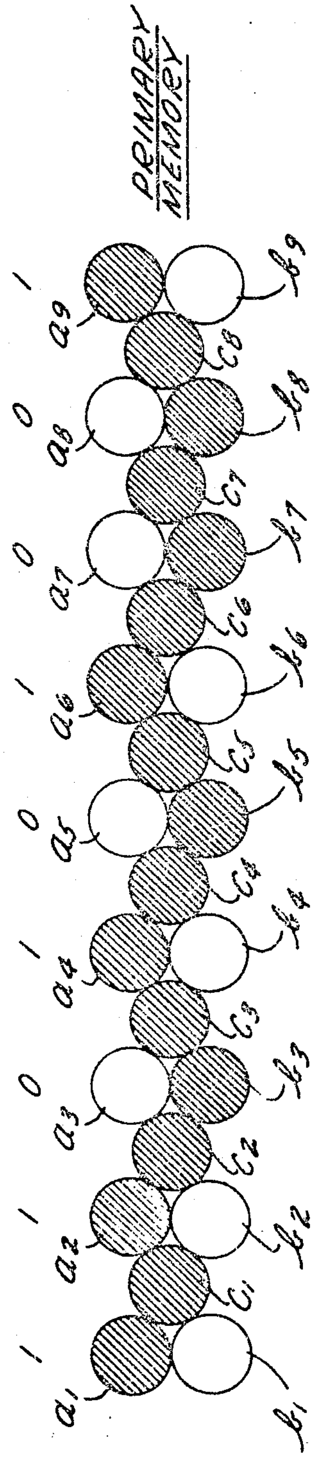

FIGURE 4*a* is an illustrative showing of a section of the primary memory crystal for variable fields or masking operation.

Figure 4B:
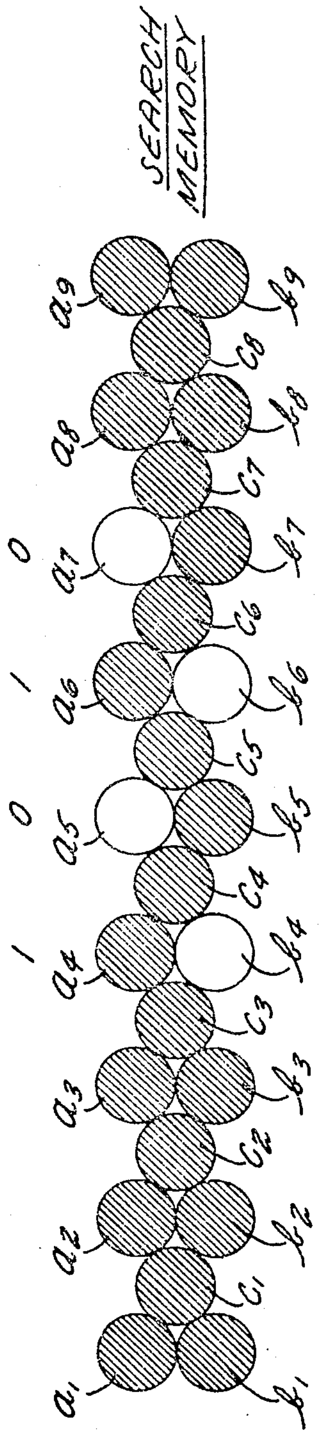

FIGURE 4*b* is an illustrative showing of the search memory crystal for variable fields or masking operation corresponding to the showing in FIGURE 4*a*.

Figure 5A:
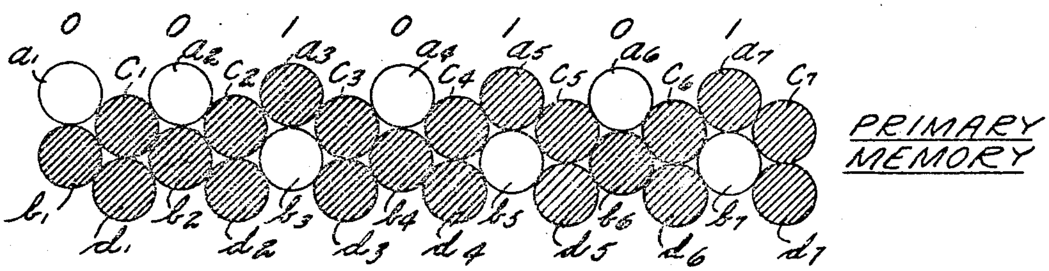

FIGURE 5*a* is an illustrative showing of one section of the primary memory crystal for operation of the system in an inequality search mode.

Figure 5B:
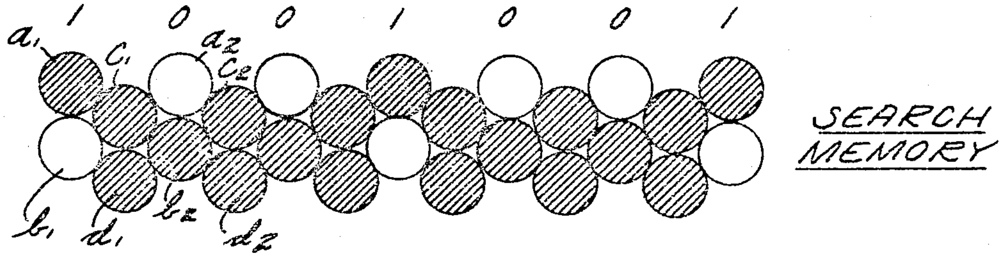

FIGURE 5*b* is an illustrative showing of the search memory crystal in the inequality search mode where the search word is larger than the memory word.

Figure 5C:
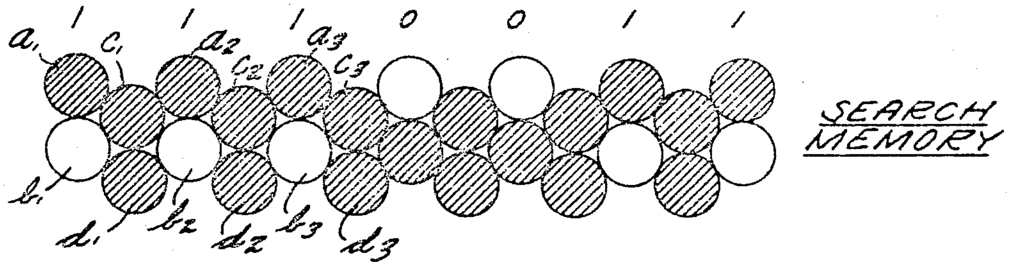

FIGURE 5*c* is another illustrative showing of the search memory crystal in the inequality search mode with a search word smaller than the word in the primary memory.

Figure 5D:
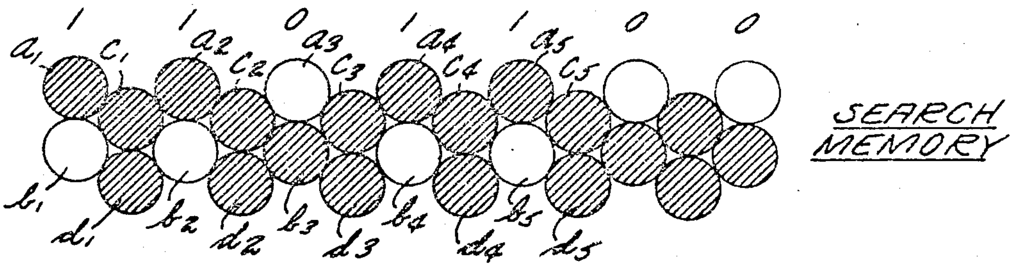

FIGURE 5*d* is another illustrative showing of the inequality search mode with a smaller search word than the word in the primary memory.

Referring now to the schematic showing of the system in FIGURE 1, a color center crystal 10 provides the primary memory storage for the system. Color center crystal 10 is a relatively thin highly colored layer of an alkali halide crystal, such as hydrogenated potassium bromide. A second thin hydrogenated potassium bromide crystal 12 serves as the search memory crystal for the system. The crystals 10 and 12 are attached to opposite ends of a bundle of optical fiber lasers 14, the ends of the bundle of fibers 14 being joined to crystals 10 and 12 with anti-reflective coatings between the crystal and the ends of the fiber bundle. The sides of crystals 10 and 12 removed from the fiber bundle are provided with highly reflective laser mirrors 16 and 18, respectively, matched to reflect most light at the wavelength of the emission from fibers 14. Pumping light is provided for the fibers 14 from an appropriate light source 20. The mirrors 16 and 18 define an optical cavity for lasing, and the crystals 10 and 12 are located within the cavity along with the fibers 14.

Since crystals 10 and 12 are inside the optical cavity, the crystals are preferably thin layers of densely colored crystals on the order of five to 10 microns in thickness to minimize diffraction losses caused by spreading of light emerging from the fibers.

Light from a laser light source 22 passes through a modulator 24 and a deflector 26 to be delivered to a dichroic mirror 28. Modulator 26 may be, for example, an electro-optic device such as a Kerr cell, or a mechanical device such as a knife edge movable across the path of the light beam. Deflector 26 could be, for example, an electro-optic device such as a barium titanate beam deflector, or a mechanical device such as a mirror. The laser beam incident on mirror 28 from source 22 is reflected from mirror 28 through mirror 16 to primary storage crystal 10. Mirror 16 is a narrow band mirror matched to the emission from fibers 14 so that mirror 16 allows passage of the different wavelength light from laser 22. A liquid nitrogen cryostat 30 with flow as shown by the arrows is provided for the purpose of maintaining crystal 12 and fibers 14 at low temperatures, cryostat 30 having appropriate windows wherever necessary to allow passage of light.

The color centers in hydrogenated potassium bromide crystal 10 are known as F centers, and the laser beam from laser source 22 is of proper wavelength and intensity to cause a bleaching transition from F centers to U centers in areas of crystal 10 which are illuminated with laser light from source 22. Since the F to U transition takes place at approximately room temperature, the liquid nitrogen is removed from cryostat 30 when writing information into crystal 10. During interrogation memory 10 is maintained at a low temperature for which no information distruction will occur. Modulator 24 and deflector 26 combine to selectively deliver the laser beam from source 22 to selected areas of crystal 10 to write or store information in crystal 10 by the F center to U center transition. F center crystals and U center crystals are discussed in application Ser. No. 217,858, filed Aug. 20, 1962, and application Ser. No. 454,294, filed May 5, 1965, both of which are assigned to the assignee of the present invention, and to which reference is hereby made. For a color center crystal 10 of hydrogenated potassium bromide, laser source 22 could be a 6328 A. helium-neon laser.

A laser light source 22′ delivers a laser beam through modulator 24′ and deflector 26′ to dichronic mirror 28′. Laser light beam source 22′ is also a 6323° helium-neon laser, and modulator 24′, deflector 26′ and mirror 28′ are the same as modulator 24, deflector 26 and mirror 28, respectively. The laser beam from source 22′ is selectively modulated and deflected by modulator 24′ and deflector 26′ and is then reflected via mirror 28′ and through mirror 18 to color center crystal 12. Potassium bromide crystal 12 is the search memory crystal, and it is maintained at liquid nitrogen temperature by operation of cryostat 30 so that transitions induced in crystal 12 due to the absorption of light from laser source 22′ are F to F′ transitions. The nature of F to F′ transitions is also discussed in the above-identified previously filed applications.

The output from laser source 22′ is delivered to a segmented cylindrical lens 32 before passing to mirror 28′. The individual cylindrical segments of lens 32 are arranged with their axes parallel to each other and perpendicular to the plane of the paper. The output from laser source 22′ passing from deflector 26′ is split into a plurality of identical repetitive signals by lens 32, the number of signals equalling the number of segments in the lens 32. In this manner there is a replication of a single search word in search crystal 12 in rows parallel to the plane of the paper for comparison with the entire field of arbitrary words in primary memory crystal 10. By way of example, for ten segments in the lens 32, ten identical bits would be formed and stored in spaced apart columns in crystal 12, the columns being perpendicular to the plane of the paper. As the output beam from laser 22′ is then deflected to the second and subsequent bits in the search word, ten additional identical bits are written each time into the search memory to fill the entire row with the search word in one writing. The beam from laser 22′ is then deflected to write the search word in subsequent rows. If necessary, shielding can be provided around laser 22′, modulator 24, deflector 26′ and lens 32 to prevent undesired light from reaching crystal 12.

If desired, only a small region of primary storage crystal 10 could be interrogated at any one time, and the search word would be written into search memory crystal 12 at a position corresponding to the position to be searched in crystal 10.

Referring now to FIGURE 2*a*, assume for purposes of illustration that the logic word 11010 had been stored in crystal 10. As employed in the present invention, each bit of information is represented in the color center crystals by three distinct spots tangent to each other as shown in the primary memory crystal depicted in FIGURE 2*a*, the three tangent spots representing a bit of information being labeled $a_1$, $b_1$, and $c_1$ through $a_5$, $b_5$ $c_5$ with subscript designations indicating successive bits. A bit of information is stored in one group of three spots by bleaching one of the information or position spots "*a*" or "*b*" by directing the laser beam to that spot. The bleaching of an "*a*" spot corresponds to a logical 1 and the "*b*" spot would remain unbleached; a bleaching of a "*b*" spot would correspond to a logical zero, and the "*a*" spot would remain unbleached. Thus, as shown in FIGURE 2*a*, the $a_1$, $a_2$, $b_3$, $a_4$, and $b_5$ spots are bleached to write the logical word 11010. The "*c*" spots in any word are always bleached transparent in both the primary memory crystal and the search memory crystal.

Optical fibers in the bundle 14 connect each spot in primary memory crystal 10 to a spot in the corresponding location in search memory crystal 12. Coincidence of two bleached spots in corresponding positions in crystal 10 and crystal 12 indicates a logical "and;" this coincidence will be recognized by and result in a sensitization of the fiber connecting the two spots. That is, there will be a continuous light path from mirror 18, through the bleached spot in crystal 12, through the fiber 14, through the corresponding bleached spot in crystal 10, to mirror 16. As a result, the fiber connecting the two bleached spots is capable of lasing if other auxiliary conditions are also satisfied. The output of the fibers 14 is selected at a proper wavelength to be absorbed by an unbleached spot in either primary memory crystal 10 or search memory crystal 12. Thus, without coincidence of bleached spots in corresponding positions on the two memory crystals the fiber connecting the two spots is prevented from lasing by the strong optical absorption in one or the other (or both) unbleached memory spots. If one memory contains a zero bit and the other memory contains a one at the corresponding position, there will be no coincidence of bleached regions for that bit because the two bleached spots differ in position within the three spot grouping for the bit. Both bits must be ones, or both zeros, for the interconnecting fiber to be sensitized for lasing. The "*a*" and "*b*" spots will sometimes hereinafter be referred to as position spots or bits, and fibers interconnecting "*a*" and "*b*" spots will sometimes hereinafter be referred to as position fibers.

As has been mentioned, the third spot, the "*c*" spot, in the three spot group is always bleached for any word in either memory, and the optical fiber interconnecting any two corresponding "*c*" spots in the separate memories is therefore always sensitized. The "*c*" spots will be referred to as coupling spots, and fibers connecting corresponding "*c*" spots in the two memories will be referred to hereinafter as coupling fibers. The function of each coupling fiber is to provide a means for associating each bit in a word with the two neighboring bits in the word.

Referring now to FIGURE 2*b*, assume that the logical word 01100 is written into search memory crystal 12. The spots $b_1$, $a_2$, $a_3$, $b_4$, and $b_5$ would be bleached by appropriate deflection of the beam from laser source 22′ to write the word. As previously mentioned, the coupling spots $c_1$, $c_2$, $c_3$, $c_4$, and $c_5$ would also be bleached by the appropriate deflection of the laser beam during the writing of the word in the search memory. Comparing this word with the word in the corresponding location in primary memory element 10 as depicted in FIGURE 2*a*, there is coincidence between the "*c*" spots in the two crystals, but the only other coincidence is between the $a_2$ spots in each crystal and the $b_5$ spots in each crystal. The coincidence between $a_2$ spots results in a three spot chain $c_1$, $a_2$, $c_2$; that is, an uninterrupted light path is provided between mirrors 16 and 18 through the corresponding spots $c_1$, $a_2$, and $c_2$ in each crystal and the respective interconnecting fibers therebetween. There is a similar three spot chain $c_4$, $b_5$, $c_5$ providing a joined three bit optical path between the mirrors 16 and 18. Since there is considerable transverse optical leakage, or "cross talk" between optical fibers, the pumping threshold of the lasers and the level of bleaching in the memories can be controlled so that any break in the entire chain resulting from a lack of coincidence between bits at any two corresponding locations in the two crystals will prevent lasing. Thus, FIGURE 2*b* search word written into crystal 12 will not cause lasing with respect to the FIGURE 2*a* word of primary memory crystal 10.

Referring now to FIGURES 3*a* and 3*b*, the word 11010 written in the search memory of FIGURE 3*b* corresponds in all respects to a word stored in the primary memory as depicted in FIGURE 3*a*. Under the conditions depicted in FIGURES 3*a* and 3*b*, there is complete coincidence between corresponding bleached spots in the two crystals through a chain of several information bits, so that there is a connected optical path between the corresponding points in each crystal. Each completed optical path is also tangent to another completed optical path which includes coupling spots "*c*" and interconnecting coupling fibers. A completed chain of adjacent completed optical paths between crystals 10 and 12 can be traced through corresponding points in each of the crystals 10 and 12 and their interconnecting fibers, the chain being $a_1$, $c_1$, $a_2$, $c_2$, $b_3$, $c_3$, $a_4$, $b_5$, $c_5$. The coupling fibers belonging to each bit "associate" the position fibers for that bit with the position fibers for neighboring bits to provide the complete chain of optical paths through the system. Thus, the coupling fiber connecting the $c_1$ spots in crystals 10 and 12 associates the $a_1$ and $a_2$ position fibers, the $c_2$ coupling fiber associates the $a_2$ and $b_3$ position fibers, the $c_3$ coupling fiber associates the $b_3$ and $a_4$ position fibers, and the $c_4$ coupling fiber associates the $a_4$ and $b_5$ fibers. The association through the coupling fibers is achieved by means of the transverse optical leakage between fibers. The chain of transversely linked fibers grows as long as coincidence occurs between succeeding bits in the primary and search crystals, and the probability for lasing in phase is enhanced by the transverse optical leakage in the chain which provides a degree of mutual reinforcement stimulation for in-phase oscillation.

The complete match of bits in both crystals 10 and 12 for an entire word as depicted in FIGURES 3*a* and 3*b* presents a complete transversely connected optical path in a group of fibers, and lasing occurs. As previously mentioned, the pumping threshold of the lasers and the level of bleaching in the memories can be controlled so that a predetermined minimum amount of mutual associative stimulation such as that produced, for example, by five transversely associated fibers or any other predetermined member is required to produce lasing. Thus, a lack of coincidence between two corresponding bits in the two crystals removing one fiber from the chain and preventing formation of the requisite chain will prevent lasing.

Referring now to FIGURES 4*a* and 4*b*, variable field length and masking is accomplished by double storing the search word in the portions of no interest. That is, in search crystal 12 of FIGURE 4*b*, bleached spots are stored at both the "*a*" and "*b*" positions for bits outside the region of interest so that coincidence with corresponding bits in primary memory crystal 10 of FIGURE 4*a* outside of the region of interest is forcibly guaranteed. For example, bleached spots are stored at $a_1$ and $b_1$, $a_2$ and $b_2$, $a_3$ and $b_3$, $a_8$ and $b_8$, $a_9$ and $b_9$ in search crystal 12. Thus, the only region subject to discrimination or identifications is the portion (or portions) of the word in the field under consideration where coincidence is not forced. For example, as shown in FIGURE 4*b* the region subject to discrimination would be the region in the search crystal corresponding to the fourth, fifth, sixth and seventh bit positions in the word. Exact identification by matching of bits at corresponding positions in the field of the search word in search crystal 12 and the memory word in memory crystal 10 will then be signified by simultaneous lasing of the entire associated chain of fibers since association will have been forced by the double storage in bits outside of the field of interest to complete an entire, although artificial, associated chain of fibers. Double storage may also be performed, alternatively by two unbleached spots rather two bleached spots, which is advantageous in some types of field association.

Proximity to an exact match may be detected by either of two techniques. One method is simply to increase the pumping power, or reduce the residual absorption level of the memories as by changing ambient temperature or by modification of bleaching to a greater or lesser degree of completion, to thus lower the lasing threshold and permit an imperfectly completed chain to lase. A second method is to detect the level of output illumination from the nonlasing system consisting of incompletely connected chains of fibers. The output will increase rapidly toward the lasing level as the chain approaches completeness, but displays very little sensitivity for comparisons that are far from proximity.

Referring now to FIGURES 5*a* through 5*d*, an arrangement for inequality searching is shown. Inequality searching requires the use of a four spot grouping rather than the three spot groupings previously discussed. Hence, the "*d*" spots will always be bleached in the primary memory crystal 10; the "*d*" spots in search memory crystal 12 will be normally unbleached, but the "*d*" spots in search crystal 12 will all be bleached when inequality searching is being performed.

FIGURE 5*a* shows the word 0010101 in primary memory crystal 10. For inequality searching the complement of the search word is written into search memory crystal 12 for comparison with primary memory crystal 10. Thus, to search the word 0110110, the complement 1001001 is stored in crystal 12 as shown in FIGURE 5*b*. The true search word (as distinguished from its complement) is bigger than the word stored in crystal 10 of FIGURE 5*a*. As seen in FIGURE 5*b*, and going from high order to low order, the first order bit for the complement of the true search word is a one with the result that the $a_1$ spot is bleached along with the $c_1$ spot and the $d_1$ spot; however the first order bit in the primary memory crystal of FIGURE 5*a* is a zero so that the $b_1$ spot is bleached along with coupling spot $c_1$ and fourth spot $d_1$. The second number in the true search word is a one, so the second order bit in the search crystal is a zero with bleaching at spots $b_2$, $c_2$ and $d_2$. The second order bit in the search crystal, now corresponds with the bleaching pattern in the second order bit of the primary memory crystal. A chain of five linked fibers is thus formed, the chain including the fibers linking the spots $c_1$, $d_1$, $b_2$, $c_2$, $d_2$ in each crystal. Each of these individual fibers is in a completed optical path between mirrors 16 and 18, and thus each of the fibers is sensitized for lasing. The threshold of the system is controlled so that lasing will occur when there is association between and transverse optical leakage between a link of five connected fibers. Thus, with the arrangements of FIGURES 5*a* and 5*b* lasing would occur on writing the second highest order bit into the search crystal. Since it is known that the zero written into the high second order bit in the search crystal is the complement of the actual one in the true search word, it is known that lasing occurred at the coincidence of zeros in the high second order bits in the search crystal and the memory crystal. Since the zero in the search crystal is an actual one in the search word, it is thus known that the search word written into search crystal 12 is larger than the word stored in primary memory 10.

Referring now to a comparison between FIGURES 5*c* and 5*a*, inequality searching is shown for the word 0001100. The complement of this search word is written into search memory crystal 12 as depicted in FIGURE 5*c*, the complement being 1110011. As can be seen, a linking chain of five matched spots in the two crystals and interconnecting fibers is not realized until the third order bit is written into the search crystal, at which time there is a completed five spot link consisting of $d_2$, $c_2$, $a_3$, $c_3$, and $d_3$, and $d_5$. Lasing occurs when the link of five fibers is established, and it is thus known that lasing occurred on the writing of a one into the search crystal. The one written into the search crystal corresponds to a zero in the actual search word, and is thus known that the inequality signaled by lasing results from the fact that the search word being written into crystal 12 is smaller than the word in memory crystal 10. In the FIGURES 5*a* and 5*c* comparisons, the search word was smaller than the memory word, and the leading high order one in the search word occurred later than the leading high order one in the primary memory crystal.

Referring now to FIGURES 5*a* and 5*d*, a comparison is shown in which the search word is smaller than the memory word, and in which the leading high order one in the search word and the memory word occur at the same position. The word to be searched in FIGURE 5*d* is 0010011, and the complement written into the search crystal depicted in FIGURE 5*d* is 1101100. The first two zeros in the actual search word result in complementary ones being stored at $a_1$ and $a_2$ in the search crystal, and no lasing occurs because the written ones do not concur with the zeros in the first two high order bits in the memory crystal. The third order bit in the actual search word is a one, and it is stored as a zero by bleaching spot $b_3$. This complementary zero written into the search crystal results in a failure of coincidence with the one stored at $a_3$ in primary memory crystal 10. The fourth order zero in the actual search word is written as a complementary one by bleaching $a_4$ and once again no lasing occurs because of a lack of coincidence with the zero at $b_4$ in the fourth order bit in the memory crystal. The fifth order digit in the actual search word is a zero which is written as a complementary one by bleaching spot $a_5$ in search memory crystal 12. The complementary one in search crystal 12 now corresponds with the one stored at spot $a_5$ in the primary memory crystal so that a link of five fibers is established consisting of $d_4$, $c_4$, $a_5$, $c_5$, and $d_5$. Lasing now occurs and it is known that the search word is smaller than the word in the primary memory crystal since lasing occurred at the writing of a complementary one into the search crystal. It is also known that the inequality does not occur until the fifth order bit, starting at the highest order bit and working toward the lowest order bit.

In the process of inequality searching, the complement of the actual search word is written one bit at a time (in all word positions throughout the search memory) from high order to low order. The order of writing in the search crystal 12 should be coupling spot *c*, upper spot *a*, lower spot *b*, and fourth spot *d*. As previously demonstrated, when the first group of five-spot-coincidence is encountered the group lases to signify that the search word differs from a word in the memory crystal. If more than one five spot group in a single word lases, the output will be correspondingly larger, thus providing a measure of magnitude of difference between the search word and the memory word. If the same five spot group in several words lases, indicating approximately equivalent inequality, the output will be larger in proportion to the number of such words.

Readout of a word which has been selected from the primary memory by an identity, proximity or inequality seach is accomplished by the inverse procedure employed to write the search memory. The word selected from the primary memory is identified by the simultaneous lasing of fibers associated with the coincidence between bits and the word as described above. Referring again to FIGURE 1, this laser output passes through mirror 16 and dicroic mirror 28 and is incident on a segmented cylindrical lens system 34 having a plurality of individual cylindrical lenses arranged with their axes parallel to each other and parallel to the plane of the paper. Lens system 34 concentrates the laser output upon a bank of photocells 36, the number of photocells in the bank being equal to the number of bits in a word. Photocells 36 convert the laser illumination into electrical signals which can then be delivered to a readout register 38. It would also be possible to introduce a display screen at the opposite end of the laser bundle from the readout register, i.e. to the left of mirror 28', if a visual indication of the location of the lasing fibers is desired.

After a word has been written into search crystal 12 and compared with primary crystal 10, crystal 12 is erased for a new interrogation cycle. F' erasing light is provided from a suitable source 40, such as a tungsten filament lamp or flash tube. When erasing is desired, an electro-optic shutter 42 is activated to allow light from lamp 40 to pass through mirror 28' and mirror 18 to illuminate search memory crystal 12 directly and to erase information bits stored in crystal 12.

As described in application Ser. No. 453,294, referred to above, erasing of primary memory crystal 10 can be accomplished, if desired, by illuminating crystal 10 with ultraviolet light.

The fibers 14 to be used in the present invention may be customary glass fiber lasers doped with neodymium (at 1.06 $\mu$) such as are known in the art. In this case the crystal transitions would be $F' \rightarrow F$ for writing and $F \rightarrow F'$ for erasing in crystal 12. The fibers might also be glass capillary tubing filled with liquid or plastic carriers of europium chelates. The europium doped fibers are attractive because its characteristic 6100 A. lasing wavelength provides a good match with the absorption band of potassium bromide.

To obtain good transverse coupling, fiber lasers as small as five microns in diameter could be used, in bundles containing up to as many as ten million fiber lasers. Such an arrangement would provide a 30,000 word, two million bit memory with cross sectional dimensions of the fiber laser bundle and the potassium bromide crystals of approximately 1 inch by ½ inch.

It will be understood that other spot arrangements than the three spot and four spot arrangements herein described can be employed within the scope of this invention. By way of one specific example, inequality searching could be accomplished with a three spot arrangement if lasing threshold were adjusted for lasing to occur upon association of a three fiber group.

While a preferred embodiment of the present invention has been shown and described, various modifications and substitutions may be made without departing from the spirit and scope of this invention. Accordingly, it is to be understood that this invention has been described by way of illustration rather than limitation.

What is claimed is:

1. An associative memory including:

a first element having centers therein transparent to light of first predetermined wavelength;

a second element having centers therein of alterable state in response to light of a second predetermined wavelength, said second element being spaced from said first element;

a plurality of optical fiber lasers positioned between said first and second elements, said fiber lasers providing paths for connecting centers in said first and second elements, said fiber lasers being capable of emitting light of said first predetermined wavelength;

means defining an optical cavity, said first and second elements and said fiber lasers being in said optical cavity; and means for altering the state of at least some of said centers in said second element to cause said altered centers to pass light of said first predetermined wavelength from said fiber lasers to complete an optical path in said optical cavity and cause at least some of said optical fibers to lase.

2. An associative memory as in claim 1 wherein said completed optical path includes said fiber lasers positioned between and connecting centers in said first element and altered centers in said second element.

3. An associative memory as in claim 1 wherein said first and second elements are alkali halide crystals and wherein said centers in said first and second elements are color centers, and wherein said optical fiber lasers connect color centers at corresponding locations in each of said first and second elements.

4. An associative memory as in claim 3 wherein said means for altering the state of centers in said second element includes means for generating a coherent light beam and means for directing said coherent light beam to selected parts of said element to bleach color centers therein in a selected pattern.

5. An associative memory as in claim 1 wherein centers in said first element represent stored information, and wherein altered centers in said second element represent search information, said some of said optical fibers lasing upon the occurrence of a predetermined relationship between centers at corresponding locations in said elements.

6. An associative memory including:

reflecting means defining an optical cavity;

a first crystal in said optical cavity having centers therein of alterable state, at least some of said centers in said first crystal being in an altered state of a first predetermined pattern and forming a chain of altered centers transparent to light of a predetermined wavelength;

a second crystal in said optical cavity having centers therein of alterable state;

optical fiber lasers positioned between said first and second crystals and providing optical communication paths between corresponding parts of said first and second crystals, said fiber lasers being capable of generating light of said predetermined wavelength; and means for altering the state of at least some of said centers in said second crystal to form a chain of altered centers transparent to light of said predetermined wavelength in a second predetermined pattern in said second crystal;

said second predetermined pattern of altered centers in said second crystal cooperating with said fiber lasers and said first crystal to complete an optical path through said optical cavity to cause at least some of said fiber lasers to lase upon the occurrence of a predetermined relationship between said second predetermined pattern of altered centers in said second crystal and said first predetermined pattern of altered centers in said first crystal.

7. An associative memory as in claim 6 wherein said first and second crystals are alkali halide crystals and wherein said centers in said first and second elements are color centers.

8. An associative memory as in claim 7 wherein said means for altering the state of centers in said second crystal includes means for generating a coherent light beam and means for directing said coherent light beam to said second crystal to bleach color centers therein.

9. An associative memory as in claim 6 wherein said relationship between said second predetermined pattern of altered centers in said second crystal and said first predetermined pattern of altered centers in said first crystal is a relationship of total coincidence between said first and second patterns.

10. An associative memory as in claim 6 wherein said relationship between said second predetermined pattern of altered centers in said second crystal and said first predetermined pattern of altered centers in said first crystal is a relationship of coincidence between parts of said first and second patterns.

11. An associative memory as in claim 6 wherein said relationship between said second predetermined pattern of altered centers in said second crystal and said first predetermined pattern of altered centers in said first crystal is a relationship of inequality between said first and second patterns.

12. An associative memory as in claim 6 wherein altered centers in said first crystal represent stored information, and wherein altered centers in said second crystal represent search information.

13. An associative memory including:

reflecting means defining an optical cavity;

a first crystal in said optical cavity having color centers therein, first groups of said color centers representing bits of information, each of said first groups having at least two position centers and at least one coupling center, a first logical state being represented by one of said position centers being transparent to light of a predetermined wavelength and a second logical state being represented by the other of said position fibers being transparent to said light, and each of said coupling centers being transparent to said light;

each coupling center in a first group of color centers cooperating with position centers in another of said first groups to form a first pattern of a chain of information bits of first logical state and second logical state position centers joined by coupling centers representing a word stored in said first crystal;

a second crystal in said optical cavity having color centers therein;

optical fiber lasers positioned between corresponding parts of said first and second crystals and providing optical communication paths between corresponding parts of said first and second crystals, said fiber lasers being capable of generating light of said predetermined wavelength; and means for altering the state of color centers in said second crystal to establish second groups of color centers in said second crystal representing bits of information, each of said second groups of color centers having at least two position centers and at least one coupling center, a first logical state being represented by one of said position centers being transparent to light of a predetermined wavelength and a second logical state being represented by the other of said position centers being transparent to said light, and each of said coupling centers being transparent to said light;

each coupling center in a second group of color centers cooperating with position centers in said group and cooperating with position centers in another of said second groups to form a second pattern of a chain of information bits of first logical state and second logical state position centers joined by coupling centers representing a search word in said second crystal;

said second pattern of information bits in said second crystal cooperating with said fiber lasers and said first crystal to complete an optical path through said optical cavity to cause at least some of said fiber lasers to lase upon the occurrence of a predetermined relationship between said second pattern of information bits in said second crystal and said first pattern of information bits in said first crystal at corresponding locations in said first and second crystals.

14. An associative memory as in claim 13:

wherein each coupling center in a first group of color centers in said first crystal is contiguous to said position centers in said first group and is contiguous to position centers in another of said first groups to form a chain of contiguous transparent color centers in said first crystal; and wherein each coupling center in a second group of color centers in said second crystal is contiguous to said position centers in said second group and is contiguous to position centers in another of said second groups to form a chain of contiguous transparent color centers in said second crystal; and wherein said fiber lasers between corresponding parts of said first and second crystals correspond to position centers and coupling centers in said corresponding parts of said crystals.

15. An associative memory as in claim 14 wherein coincidence between transparent centers in corresponding parts of said first and second crystals sensitizes said fiber lasers between said coincident transparent centers; and wherein lasing of said fiber lasers occurs upon the formation of a predetermined chain of contiguous sensitized fiber lasers.

16. An associative memory as in claim 13 wherein said means for altering the state of centers in said second crystal includes means for generating a coherent light beam and means for directing said coherent light beam to said second crystal to bleach color centers therein.

17. An associative memory as in claim 13 wherein said predetermined relationship between said second pattern of information bits in said second crystal and said first pattern of information bits in said first crystal is a relationship of total coincidence between said patterns.

18. An associative memory as in claim 13 wherein said predetermined relationship between said second pattern of information bits in said second crystal and said first pattern of information bits in said first crystal is a relationship of coincidence between parts of said first and second patterns.

19. An associative memory as in claim 13 wherein said predetermined relationship between said second pattern of information bits in said second crystal and said first pattern of information bits in said first crystal is a relationship of inequality between said first and second patterns.

20. An associative memory as in claim 13 wherein said first crystals is an alkali halide color center crystal in which F to U center transitions occur, and in which said second crystal is an alkali halide color center crystal in which F to F′ transitions occur.

21. An associative memory as in claim 13 including means for readout of lasing from said fiber lasers.

References Cited

UNITED STATES PATENTS 3,296,594 1/1967 Van Heerden -------- 340—173

TERRELL W. FEARS, *Primary Examiner.*

U.S. Cl. X.R.

340—172.5